(12) United States Patent
Jing et al.

(10) Patent No.: US 12,044,591 B2
(45) Date of Patent: Jul. 23, 2024

(54) MINIATURE DIAPHRAGM-BASED FIBER-OPTIC TIP FP PRESSURE SENSOR, AND FABRICATION METHOD AND APPLICATION THEREOF

(71) Applicant: DALIAN UNIVERSITY OF TECHNOLOGY, Liaoning (CN)

(72) Inventors: Zhenguo Jing, Liaoning (CN); Wei Peng, Liaoning (CN); Yueying Liu, Liaoning (CN); Qiang Liu, Liaoning (CN); Ang Li, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 784 days.

(21) Appl. No.: 17/259,847

(22) PCT Filed: Aug. 26, 2020

(86) PCT No.: PCT/CN2020/111279
§ 371 (c)(1),
(2) Date: Jan. 12, 2021

(87) PCT Pub. No.: WO2021/052123
PCT Pub. Date: Mar. 25, 2021

(65) Prior Publication Data
US 2022/0026297 A1 Jan. 27, 2022

(30) Foreign Application Priority Data
Sep. 18, 2019 (CN) .......................... 201910880584.9

(51) Int. Cl.
*G01L 9/00* (2006.01)
*G02B 6/255* (2006.01)

(52) U.S. Cl.
CPC .......... *G01L 9/0077* (2013.01); *G02B 6/2551* (2013.01); *G02B 6/2552* (2013.01)

(58) Field of Classification Search
None
See application file for complete search history.

(56) References Cited

U.S. PATENT DOCUMENTS

| 6,548,176 B1 | 4/2003 | Gwo |
| 6,925,213 B2 | 8/2005 | Boyd |

(Continued)

FOREIGN PATENT DOCUMENTS

| CN | 101655353 A | 2/2010 |
| CN | 106017756 A | 10/2016 |

(Continued)

OTHER PUBLICATIONS

Sinha et al., Investigation of the suitability of silicate bonding for facet termination in active fiber devices, Optics Express vol. 15, No. 20, pp. 13003-13022, Oct. 1, 2007. (Year: 2007).*

(Continued)

*Primary Examiner* — Lisa L Herring
(74) *Attorney, Agent, or Firm* — Muncy, Geissler, Olds & Lowe, P.C.

(57) ABSTRACT

A miniature diaphragm-based fiber-optic tip FP pressure sensor, and fabrication method and application thereof. A miniature diaphragm-based fiber-optic tip FP pressure sensor includes an optical fiber, a hollow-core optical fiber, and a pressure sensing diaphragm, wherein the optical fiber and the hollow-core optical fiber have the same diameter, the two are spliced by arc welding; and the pressure sensing diaphragm is bonded to the endface of the hollow-core optical fiber by hydroxide catalysis bonding. The FP pressure sensor can not only realize the all-silica structure of a sensor, but also make the joint of each component free of organic polymer, and has extremely high long-term stability and thermal stability. Meanwhile, by a fabrication method of the miniature diaphragm-based fiber-optic tip FP pressure sen- (Continued)

sor, the application range and service life of the sensor are increased, and fabrication costs are reduced.

4 Claims, 2 Drawing Sheets

(56) References Cited

U.S. PATENT DOCUMENTS

| | | | |
|---|---|---|---|
| 2005/0062979 A1* | 3/2005 | Zhu | G01L 9/0079 356/480 |
| 2011/0023617 A1* | 2/2011 | Yu | G01L 9/0079 264/1.27 |

FOREIGN PATENT DOCUMENTS

| | | |
|---|---|---|
| CN | 108444623 A | 8/2018 |
| CN | 110057479 A | 7/2019 |
| CN | 110487454 A | 11/2019 |

OTHER PUBLICATIONS

Cooper, Kristie L.; Wang, Anbo & Pickrell, Gary R. Optical Fiber High Temperature Sensor Instrumentation for Energy Intensive Industries, report, Nov. 14, 2006; Blacksburg, Virginia. (Year: 2006).*

Guo; "High-Sensitivity, High-Frequency Extrinsic Fabry-Perot Interferometric Fiber-Tip Sensor Based on a Thin Silver Diaphragm;" Optics Letters, 2012, 37(9): 1505-1507; (pp. 3).

Wenhua; "Adhesive-Free Bonding Homogenous Fused-Silica Fabry-Perot Optical Fiber Low Pressure Sensor in Harsh Environments by CO2 Laser Welding", Optics Communications, 2019, 435: 97-101; (pp. 5).

Wang; "All-Fused-Silica Miniature Optical Fiber Tip Pressure Sensor", Optics Letters, 2006, 31(7): 885-887; (pp. 3).

Wu; "A Highly Sensitive Fiber-Optic Microphone Based on Graphene Oxide Membrane", Journal of Lightwave Technology, 2017, 35(19): 4344-4349; (pp. 6).

Wang; "Miniature All-Silica Optical Fiber Pressure Sensor With an Ultrathin Uniform Diaphragm", Optics Express, 2010, 18(9): 9006-9014; (pp. 9).

Abeysinghe; "A Novel MEMS Pressure Sensor Fabricated on an Optical Fiber", IEEE Photonics Technology Letters, 2001, 13(9): 993-995; (pp. 3).

Van Veggel; "Hydroxide Catalysis Bonding for Astronomical Instruments", Advanced Optical Technologies, 2014,3(3):293-307; (pp. 15).

"Flat and Corrugated Diaphragm Design Handbook", Mechanical Engineering, New York, Basel Marcel Dekker, 1982; pp. 130-156.

* cited by examiner

MINIATURE DIAPHRAGM-BASED FIBER-OPTIC TIP FP PRESSURE SENSOR, AND FABRICATION METHOD AND APPLICATION THEREOF

TECHNICAL FIELD

The present invention relates to a fabrication method of a miniature diaphragm-based fiber-optic tip Fabry-Perot (FP) pressure sensor, mainly including arc welding and hydroxide catalysis bonding assembly schemes of the sensor, and a preparation method of a hydroxide catalysis bonding solution.

BACKGROUND

Pressure sensors are widely used in industrial manufacturing, medical care, aerospace, and other fields. A pressure sensor made of optical fiber has high application research value due to the advantages of small volume, high sensitivity, electromagnetic interference resistance, and the capability of transmitting signals over long distances. The performance of a fiber-optic sensor is mainly affected by factors such as sensitivity, response time, detection range, temperature cross-sensitivity, volume size, and structure stability, wherein structure stability is the key factor to determine whether the sensor can be applied.

A fiber-optic FP interferometer is an important fiber-optic sensor model, including an intrinsic FP interferometric sensor and an extrinsic FP interferometric sensor structurally. An FP interferometric cavity of the intrinsic FP interferometric sensor is directly formed by optical fiber itself, and optical fiber which is sensitive to external information is used as a sensing element; while in the extrinsic FP interferometric sensor, optical fiber only plays a role of an optical transmission medium, and an interferometric cavity sensitive to external information is realized by other functional elements. The diaphragm-based extrinsic FP interferometric (DEFPI) fiber-optic sensor can accurately measure pressure parameters and plays an important role in the field of fiber-optic pressure sensors due to the characteristics of simple fabrication, compact structure, fast response, high sensitivity, and controllability. In the DEFPI fiber-optic sensor, a low-finesse FP interferometer is formed by a flat endface of optical fiber and an inner surface of the pressure sensing diaphragm spaced away from same at a certain distance. The DEFPI fiber-optic sensor is sensitive to pressure parameters through the diaphragm structure. Under the action of ambient pressure, the diaphragm is elastically deformed, which leads to the change in the distance between the endface of the optical fiber and the inner surface of the pressure sensing diaphragm, that is, a change in the FP cavity length of the interferometer. The pressure sensitivity is co-determined by the material, radial dimension, and thickness of the diaphragm, by changing these three parameters, measurement of pressure with different sensitivities can be achieved, being suitable for the measurement of static pressure, sound wave, and other physical quantities in inflammable and explosive, strong electromagnetic interference and other severe environments.

In a traditional DEFPI fiber-optic sensor, optical fiber is generally nested in a collimation capillary tube having an inner diameter matching the outer diameter of the optical fiber, a pressure sensing diaphragm is fixed to another endface of the collimation capillary tube, and a low-finesse FP interferometer is formed by a flat endface of the nested optical fiber and an inner surface of the pressure sensing diaphragm, as shown in FIG. 1. However, the size of the sensor of such a structure is limited by the size of the capillary tube, the sensor has a diameter of a few millimeters in general, which is much larger than that of the optical fiber, has a large volume, and has slightly low structure stability.

The present invention relates to a miniature pressure sensor located at the fiber-optic tip, which has a structure formed by splicing an optical fiber with a hollow tubular structure having the same diameter as the optical fiber and then fixing a pressure sensing diaphragm having the same diameter as the optical fiber to another endface of the hollow tubular structure, as shown in FIG. 2. Because the sensor has a small volume and compact structure, the requirements for alignment and fixation operations of the diaphragm are extremely high, so it is difficult for the conventional diaphragm fixation technology to meet the assembly requirements of such a sensor.

At present, the diaphragm fixation methods used in the assembly process of diaphragm-based fiber-optic FP pressure sensors in literature reports mainly include epoxy resin and other organic adhesive adhesion, laser welding, arc welding, direct bonding, thermal bonding, and anodic bonding. However, the above methods have the disadvantages of poor thermal stability, low precision alignment, and low efficiency, greatly limiting the application space, production efficiency, and service life of diaphragm-based sensors. The technology for fabricating a sensor by fixing a pressure sensing diaphragm by means of epoxy resin and other organic adhesive adhesion is relatively simple. However, epoxy resin and other organic adhesives are not resistant to high temperature and are easy to creep under long-term stress, directly limiting the application of sensors in the field of high-temperature and high-pressure sensing and the aspect of long-term monitoring, as described in unpatented literature 1 ("High-sensitivity, high-frequency extrinsic Fabry-Perot interferometric fiber-tip sensor based on a thin silver diaphragm", Optics Letters, 2012, 37(9): 1505-1507.). In unpatented literature 2 ("Adhesive-free bonding homogenous fused-silica Fabry-Perot optical fiber low pressure sensor in harsh environments by $CO_2$ laser welding", Optics Communications, 2019, 435: 97-101.) and unpatented literature 3 ("All-fused-silica miniature optical fiber tip pressure sensor", Optics Letters, 2006, 31(7): 885-887.), both laser welding and arc welding are welding methods based on thermal effect, and these two methods are not only low in efficiency, but also require a thicker and larger-diameter diaphragm to ensure a success rate, reducing the sensitivity of the sensor, resulting in over-large volume. As described in unpatented literature 4 ("A highly sensitive fiber-optic microphone based on graphene oxide membrane", Journal of Lightwave Technology, 2017, 35(19): 4344-4349), direct bonding mainly relies on van der Waals force or hydrogen bonds to assemble the fiber-optic sensor, which cannot provide sufficient structural strength and long-term stability. In unpatented literature 5 ("Miniature all-silica optical fiber pressure sensor with an ultrathin uniform diaphragm", Optics Express, 2010, 18(9): 9006-9014), thermal bonding is a bonding method that can provide high intensity, but requires a high-temperature tool (such as a propane blowtorch) to make two interfaces to be bonded reach a molten state at the same time, resulting in low efficiency of alignment between the diaphragm and the hollow tube, unachievable high-precision bonding alignment, thus resulting in oversize of diaphragm, over-large volume of sensor. As described in unpatented literature 6 ("A novel MEMS pressure sensor fabricated on an optical fiber", IEEE Photonics Technology Letters, 2001, 13(9): 993-995.), for anodic bonding, in order to reach high bonding strength, high voltage is generally required to be applied to interfaces to be bonded, and a high-voltage device is required, so it is difficult to realize accurate alignment assembly of micro-sized diaphragm devices.

In this patent, in order to overcome the defects of the existing diaphragm assembly technology of DEFPI fiber-optic sensors, the hydroxide catalysis bonding method is applied to the diaphragm assembly technology. Since the 1990s, in order to meet the harsh launch and use conditions of NASA's Gravity probe GP-B program, D.-H. Gwo from Stanford University researched on cryogenic bonding technology, as described in patent literature 7 (Hydroxide-catalyzed bonding: U.S. Pat. No. 6,548,176. 2003-4-15.). As an ideal and reliable solid bonding method, the hydroxide catalysis bonding technology developed and patented by D.-H. Gwo has been widely used in the field of astronomy, mainly including surface gravitational wave detector (GEO600, Advanced LIGO, and Virgo), and space-based gravitational wave detector (Lisa Pathfinder). After nearly twenty years of development, the hydroxide catalysis bonding technology is applied to scientific research, astronomical observation, optical component assembly, optical communication, laser fabrication, and other various fields. The hydroxide catalysis bonding technology has the characteristic that an alkaline solution containing hydroxide ions is applied to surfaces of two oxides or oxidizable substances (such as silicon oxide, sapphire, silicon, and silicon carbide). As the catalyst, hydroxide ions catalyze the hydrolysis of the surfaces of the substances coining into contact with same, thereby releasing silicate ions. After the silicate ions are released into the solution, the number of active hydroxide ions is gradually decreased. Once the pH of the solution is less than 11, the silicate ions are dissociated to form siloxane chains and are polymerized. As the siloxane chains are gradually lengthened, the strength of a network structure formed by these chains is increased, and then the two surfaces are connected together. As water molecules evaporate continuously, siloxane condenses chemical bonds, and dehydration reaction occurs, to form three-dimensional network structures tangled with each other, providing sufficient strength for bonding the two surfaces, as described in unpatented literature 8 ("Hydroxide catalysis bonding for astronomical instruments", Advanced Optical Technologies, 2014, 3(3):293-307.). According to different materials and sizes of the surfaces to be bonded and different concentrations of bonding solutions, bonding strengths are different to some extent, the minimum bonding strength is 1.19 MPa, and the maximum bonding strength is 70 MPa.

In the present invention, by using the hydroxide catalysis bonding method to assemble the DEFPI fiber-optic sensor, not only a bonding operation at normal temperature and normal pressure can be realized, but also high-precision alignment can be obtained, and then a miniature pressure sensor located at a fiber-optic tip can be fabricated. The scheme can provide a hundred-nanometer-thickness bonding layer with high strength, high-temperature resistance, and good optical properties, and the sensor has no organic material in the entire structure, which increases performance and service life, and has extremely high long-term stability and thermal stability, so that the sensor can be applied to pressure measurement in high temperature, high pressure, strong corrosion, and other extreme environments, and can be applied to pressure measurement under the condition of limited space in human body in the medical and clinical field.

SUMMARY

The present invention provides a diaphragm structure assembly technology of a miniature diaphragm-based fiber-optic tip FP pressure sensor, the sensor having a sensing zone length of several microns to thousands of microns, compact and small structure, high sensitivity and controllability. To overcome the defects and deficiencies in the existing sensor diaphragm structure assembly technology, the present invention adopts a diaphragm assembly technology of hydroxide catalysis bonding, so that a DEFPI fiber-optic sensor has more stable performance, and can be applied to pressure measurement in extreme environments.

The technical solution of the present invention is:

A miniature diaphragm-based fiber-optic tip FP pressure sensor, comprising an optical fiber 1, hollow-core optical fiber 4, and a pressure sensing diaphragm 3, wherein the optical fiber 1 and the hollow-core optical fiber 4 have the same diameter, the two are spliced by arc welding; and the pressure sensing diaphragm 3 is bonded to the endface of the hollow-core optical fiber 4 by hydroxide catalysis bonding;

the hollow-core optical fiber 4 has an inner diameter of 30-100 μm, and a length of 10-1000 μm; and the pressure sensing diaphragm 3 has a thickness of 0.1-100 μm.

The diaphragm is made of silicon dioxide, silicon, or sapphire.

The hollow-core optical fiber 4 is a hollow-core optical fiber or a multimode optical fiber with fiber core removed by corrosion.

The pressure sensing diaphragm is an important part of the DEFPI fiber-optic sensor, and the sensor senses the change in external physical quantities through the diaphragm. For example, as described in unpatented literature 9 ("Flat and corrugated diaphragm design handbook", Mechanical Engineering New York Basel Marcel Dekker, 1982.), for the DEFPI fiber-optic sensor, an FP cavity is formed between the optical fiber and the center of the inner surface of the diaphragm, so there is only a need to consider the deformation of the center of the diaphragm, the deformation equation of the center of the circular diaphragm is $$y = \frac{3(1-v^2)P}{16Eh^3}a^4$$

where y represents the deformation quantity of the center of the diaphragm, P represents pressure, E represents Young's modulus, h represents the thickness of the diaphragm, a represents the effective radius of the diaphragm, and v represents Poisson's ratio.

It can be seen from the above equation, the sensitivity of the circular diaphragm mainly depends on the thickness, radius, and material of the diaphragm. For a diaphragm made of selected material, to improve the sensitivity, the radius of the diaphragm can be increased or the thickness of the diaphragm can be reduced appropriately. The selection of the material of the diaphragm directly affects the performance and applicable environment of the sensor, and is very important to the design and fabrication of the sensor. The sensitivity, repeatability, and other parameters of the sensor are largely related to the material properties of the sensor diaphragm, such as Young's modulus, Poisson's ratio, thermal expansion coefficient, and the like. The influence of temperature on the sensitivity of the fiber-optic pressure sensor cannot be ignored. To reduce the sensitivity of the sensor to temperature, it is very important to select a material with a low thermal expansion coefficient as material for the diaphragm. Because silicon oxide, silicon, and sapphire have the advantages of high corrosion resistance and small thermal expansion coefficient, optical fiber, hollow tube, and diaphragm made of these three materials are selected to form a miniature pressure sensor located at a fiber-optic tip in the present invention. Moreover, the sensor involved in the present invention is fabricated only using arc welding and hydroxide catalysis bonding, has no organic component, so the bonding interfaces at the joint between the diaphragm and the hollow tube are tight, has high strength, and has high long-term stability and thermal stability.

A fabrication method of the miniature diaphragm-based fiber-optic tip FP pressure sensor, comprising the following steps:

(1) preparing bonding solution, including the first solution formed by mixing NaOH or KOH with a molar ratio of 1:500 with water, and second solution, i.e. sodium silicate aqueous solution with a mass percentage concentration of 1-7%: mixing and uniformly shaking, filtering using a microporous filter with an aperture less than 0.2 μm, thus obtaining the bonding solution;

(2) taking an optical fiber 1, peeling off a cladding, wiping with alcohol, and cutting the endface of the optical fiber 1 with a fiber cleaver; taking a hollow-core optical fiber 4, and cutting the endface of the hollow-core optical fiber 4 flatly with the fiber cleaver;

(3) placing the optical fiber 1 and the hollow-core optical fiber 4 in a fusion splicer in a mode of aligning the endface of the optical fiber 1 with the end face of the hollow-core optical fiber 4, conducting discharge splicing, the discharge strength being 30-50 bit, the discharge time being 1000-1500 ms, obtaining an optical fiber-hollow-core optical fiber structure;

(4) immersing the optical fiber-hollow-core optical fiber structure in methanol and acetone in sequence, and taking out and washing the immersed structure with deionized water;

(5) preparing pressure sensing diaphragms 3, the pressure sensing diaphragms 3 and the optical fiber 1 having the same diameter; sucking a single diaphragm by a negative pressure device, placing the diaphragm on a clean plastic slide, and slightly washing with ethanol, to achieve the purpose of obtaining an absolutely clean surface to be bonded;

(6) dropping the bonding solution on a hydrophilic slide to make same uniformly distributed; dipping the bonding solution on the slide with the tip of the hollow-core optical fiber 4 of the optical fiber-hollow-core optical fiber structure treated in step (4), aligning the optical fiber-hollow-core optical fiber structure with the pressure sensing diaphragm 3 with a fixture, bonding, discharging air bubbles, and standing at normal temperature, to preliminarily cure the bonding solution; and (7) after the bonding solution is preliminarily cured, standing the bonding solution at room temperature for tens of days, to completely cure the bonding solution.

The miniature diaphragm-based fiber-optic tip FP pressure sensor can detect static pressure and dynamic pressure simultaneously, mainly including air pressure, hydraulic pressure, and sound pressure, and can be used as an organism pressure sensor, an oil well pressure sensor, a bridge and dam osmotic pressure sensor, a fiber-optic microphone, a hydrophone, and various sound pressure sensors.

The present invention has the following beneficial effects:

(1) The sensor is located at the fiber-optic tip, is small in size, and can be used as a probe to probe into narrow space deeply without affecting the detection environment.

(2) The interface after curing of hydroxide catalysis bonding solution is extremely thin and has good optical and mechanical properties, and the DEFPI fiber-optic sensor assembled by means of this technology has excellent long-term stability and can withstand high temperature above 50° C.

(3) An ultra-thin circular diaphragm with the same diameter as the optical fiber is used as a pressure sensing diaphragm, which has high sensitivity and response bandwidth. The sensitivity can be adjusted by adjusting the thickness and effective radius of the diaphragm.

(4) By means of arc welding, the optical fiber and the hollow tubular structure with the same diameter as the optical fiber are directly spliced, and then the pressure sensing diaphragm with the same diameter as the optical fiber is accurately assembled at the end of the hollow tubular structure by hydroxide catalysis bonding so that the entire sensor is free of organic components, the application range of the sensor is expanded, and the service life is prolonged.

(5) Diaphragm bonding can be carried out under normal temperature and normal pressure conditions without high temperature, high pressure or high voltage and strong corrosive chemical, the operation process is efficient, safe, and reliable.

(6) The precision alignment is high, which is suitable for diaphragms with any thickness and size, and high-precision alignment and bonding operations can be performed on ultra-thin small diaphragms.

In the figures: 1. optical fiber; 2. collimation capillary tube matching optical fiber in outer diameter; 3. pressure sensing diaphragm; 4. hollow-core optical fiber; 5. fiber core of optical fiber; 6. cladding of optical fiber; 7. bonding solution; 8. broadband light source; 9. circulator; 10. spectrometer; 11. computer; 12. sensor; 13. pressure device.

DETAILED DESCRIPTION

Specific embodiments of the present invention are described below in detail in combination with the technical solution and accompanying drawings.

Embodiment 1

Figure 1:
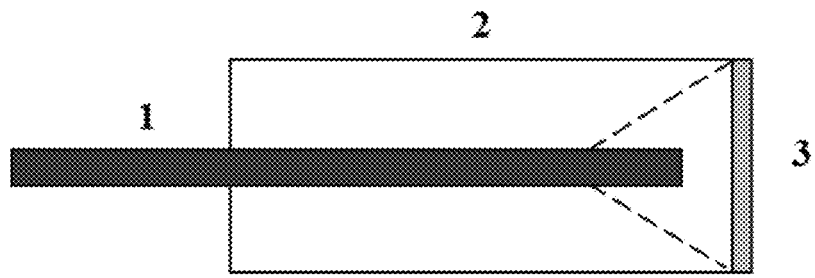
FIG. 1 is a structural schematic diagram of a traditional DEFPI fiber-optic sensor.
Figure 2:
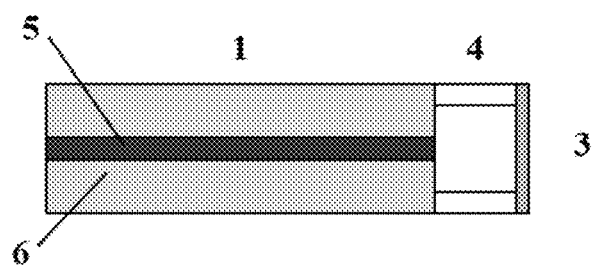
FIG. 2 is a structural schematic diagram of a miniature diaphragm-based fiber-optic tip FP pressure sensor.

In the present invention, a dual-beam interferometric structure is formed by a single-mode optical fiber, a hollow-core optical fiber, and a silicon dioxide diaphragm, and the all-silica structure of a sensor is realized by only using arc welding and hydroxide catalysis bonding, and the structure of the sensor is shown in FIG. 2. The single-mode optical fiber has a diameter of 125 μm, and a fiber core diameter of 9 μm; the hollow-core optical fiber has an outer diameter of 125 μm, and an inner diameter of 80 μm; and the silicon dioxide diaphragm has a diameter of 125 μm, and a thickness of 1 μm. The end surface of the optical fiber and the inner surface of the silicon dioxide diaphragm form two reflecting surfaces, and two beams of reflected light form dual-beam interference on the two surfaces, thereby forming a low-finesse FP interferometer. When the external pressure acts on the silicon dioxide diaphragm, the silicon dioxide diaphragm is elastically deformed, which leads to the changes in the cavity length of the FP interference. At this time, the pressure can be obtained by measuring the changes in the effective cavity length.

(1) Preparing bonding solution: taking 1 part of commercial sodium silicate aqueous solution which consists of 14 wt. % sodium hydroxide and 27 wt. % silicon dioxide, diluting the sodium silicate aqueous solution with 6 parts of deionized water according to the volume ratio, mixing and uniformly shaking, and then filtering using a microporous filter with an aperture less than 0.2 μm, thus obtaining the bonding solution.

Figure 3A:
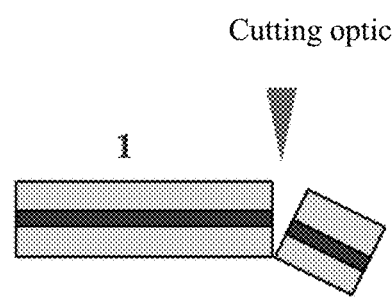
FIGS. 3(a) and 3(b) are schematic diagrams of the endface cutting method of the optical fiber and hollow-core optical fiber.
Figure 3B:
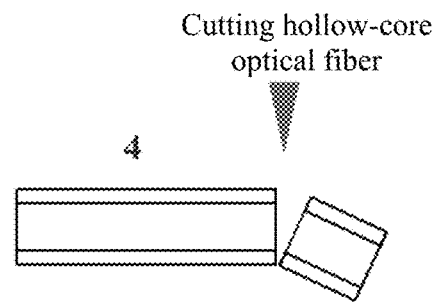

(2) Taking an optical fiber 1, and cutting an endface of the optical fiber 1 with a fiber cleaver, as shown in FIG. 3(a); and taking a hollow-core optical fiber 4, and cutting the endface of the hollow-core optical fiber 4 with the fiber cleaver, as shown in FIG. 3(b).

Figure 4A:
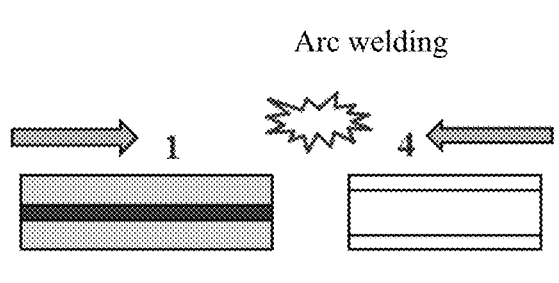
FIGS. 4(a) and 4(b) are schematic diagrams of the fabrication method of the optical fiber-hollow-core optical fiber structure.

(3) Placing the optical fiber 1 and the hollow-core optical fiber 4 in a fusion splicer in a mode of aligning the endface of the optical fiber 1 with the endface of the hollow-core optical fiber 4, conducting discharge splicing, the discharge strength being 45 bit, the discharge time being 1000 ms, obtaining an optical fiber-hollow-core optical fiber structure, as shown in FIG. 4(a).

Figure 4B:
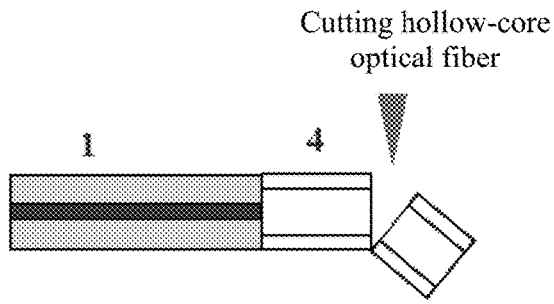

(4) Under a microscope, cutting another endface of the spliced hollow-core optical fiber 4 flatly, wherein the length of the cut hollow-core optical fiber 4 is about 150 μm, which is the sensing cavity length, as shown in FIG. 4(b).

(5) Immersing the optical fiber-hollow-core optical fiber structure in methanol and acetone in sequence, and taking out and washing the immersed structure with deionized water.

Figures 5A, 5B, 5C:
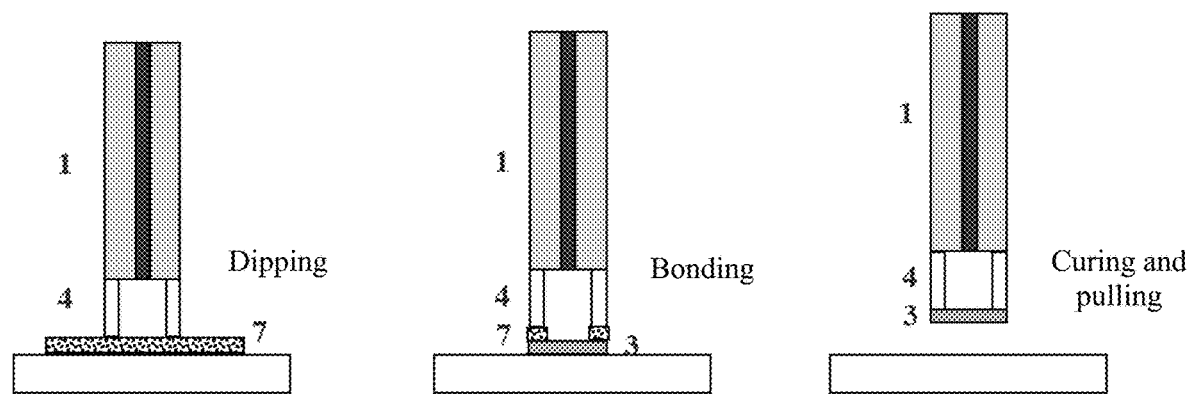
FIGS. 5(a), 5(b) and 5(c) are schematic diagrams of the bonding process of the pressure sensing diaphragm.

(6) Taking silicon dioxide diaphragms prepared by the micro-electro-mechanical system (MEMS) technology as pressure sensing diaphragms 3, the pressure sensing diaphragms 3 having the same diameter as the optical fiber 1; sucking a single diaphragm by a negative pressure device, placing the diaphragm on a clean plastic substrate, and slightly washing with ethanol, to achieve the purpose of obtaining an absolutely clean surface to be bonded;

(7) Dropping the bonding solution on a hydrophilic slide to make same uniformly distributed; dipping the bonding solution on the slide with the endface of the optical fiber-hollow-core optical fiber structure treated in step (5), as shown in FIG. 5(a); aligning the optical fiber-hollow-core optical fiber structure with the pressure sensing diaphragm 3 with a clamp, bonding, discharging air bubbles, and standing at normal temperature, to preliminarily cure the bonding solution, as shown in FIG. 5(b).

(8) After the bonding solution is preliminarily cured, standing the bonding solution at room temperature for tens of days, to completely cure the bonding solution, as shown in FIG. 5(c); or placing the bonding solution in a vacuum oven for tens of hours for performing heat treatment and accelerating curing.

Figure 6:
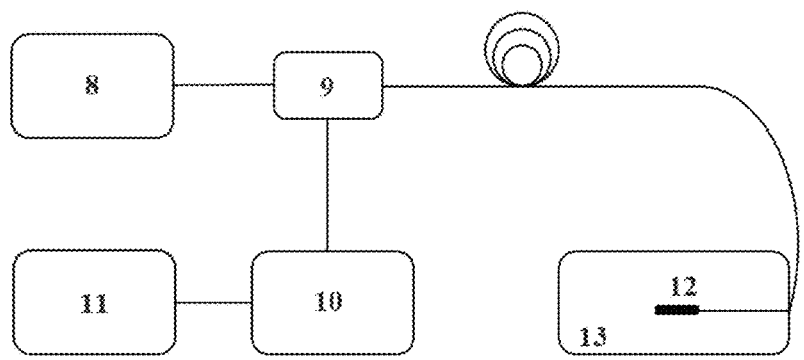
FIG. 6 is the spectrum of a miniature diaphragm-based fiber-optic tip FP pressure sensor.
Figure 7:
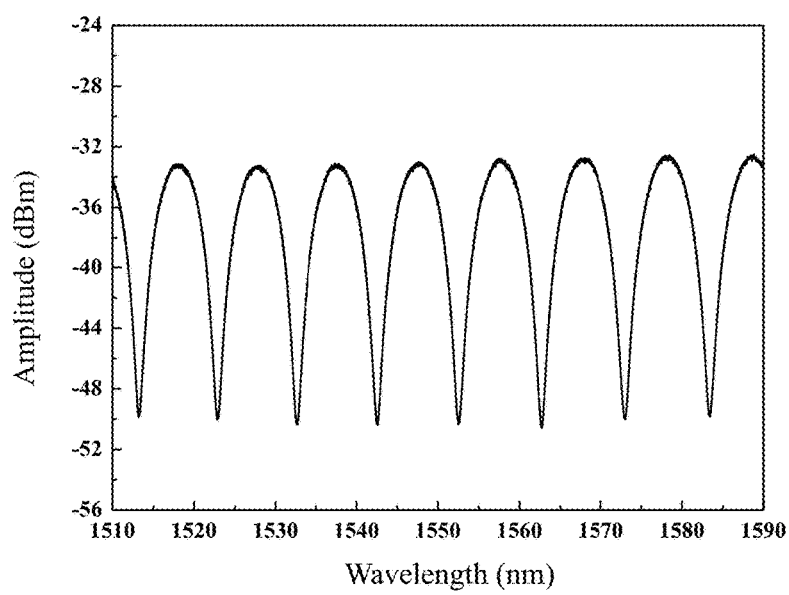
FIG. 7 is a schematic diagram of an air pressure sensor detection device.

(9) Connecting the sensor 12 with the broadband light source 8 and the spectrometer 10 through the circulator 9, so the reflection spectrum of the sensor can be detected, then placing the sensor 12 in the pressure device 13, changing the air pressure inside the device, observing the change in the spectrum and demodulating change in cavity length by using the algorithm in the computer 11, so that a linear curve of cavity length changing with air pressure can be obtained; and measuring the absolute pressure value through the cavity length change curve, as shown in FIGS. 6 and 7.

The sensor can detect static air pressure, hydraulic pressure, and dynamic sound pressure signals, and can be used as an altitude airspeed sensor, an organism pressure sensor, a fiber-optic microphone, and a hydrophone.

The invention claimed is:
1. A fabrication method of a miniature diaphragm-based fiber-optic tip Fabry-Perot (FP) pressure sensor, comprising the following steps:
   (1) preparing bonding solution, including a first solution obtained by mixing NaOH or KOH with a molar ratio of 1:500 with water, and a second solution that is a sodium silicate aqueous solution with a mass percentage concentration of 1-7%: mixing and uniformly shaking, filtering using a microporous filter with an aperture less than 0.2 μm, thus obtaining the bonding solution;
   (2) taking an optical fiber, peeling off a cladding, wiping with alcohol, and cutting an endface of the optical fiber with a fiber cleaver; taking a hollow-core optical fiber, and cutting an endface of the hollow-core optical fiber flatly with the fiber cleaver;
   (3) placing the optical fiber and the hollow-core optical fiber in a fusion splicer in a mode of aligning the endface of the optical fiber with the endface of the hollow-core optical fiber, conducting discharge splicing, a discharge strength being 30-50 bit, a discharge time being 1000-1500 ms, obtaining an optical fiber-hollow-core optical fiber structure;
   (4) immersing the optical fiber-hollow-core optical fiber structure in methanol and acetone in sequence, and taking out and washing the immersed optical fiber-hollow-core optical fiber structure with deionized water;
   (5) preparing pressure sensing diaphragms, the pressure sensing diaphragms and the optical fiber having the same diameter; sucking a single diaphragm of the pressure sensing diaphragms by a negative pressure device, placing the single pressure sensing diaphragm on a clean plastic substrate, and slightly washing with ethanol, to achieve the purpose of obtaining an absolutely clean surface to be bonded;
   (6) dropping the bonding solution on a hydrophilic slide to make same uniformly distributed; dipping the bonding solution on the hydrophilic slide with a tip of the hollow-core optical fiber of the optical fiber-hollow-core optical fiber structure treated in step (4), aligning the optical fiber-hollow-core optical fiber structure with the single diaphragm with a clamp, bonding, discharging air bubbles, and standing at room temperature, to preliminarily cure the bonding solution; and
   (7) after the bonding solution is preliminarily cured, holding the bonding solution at room temperature to completely cure the bonding solution.

2. The fabrication method of a miniature diaphragm-based fiber-optic tip FP pressure sensor according to claim 1, wherein the miniature diaphragm-based fiber-optic tip FP pressure sensor comprises:
   the optical fiber;
   the hollow-core optical fiber; and
   the pressure sensing diaphragms,
   wherein the hollow-core optical fiber has an inner diameter of 30-100 μm and a length of 10-1000 μm, and
   wherein the pressure sensing diaphragms have a thickness of 0.1-100 μm.

3. The fabrication method of the miniature diaphragm-based fiber-optic tip FP pressure sensor according to claim 1, wherein the pressure sensing diaphragms are made of silicon dioxide, silicon, or sapphire.

4. The fabrication method of the miniature diaphragm-based fiber-optic tip FP pressure sensor according to claim 1, wherein the hollow-core optical fiber is a hollow-core optical fiber or a multimode optical fiber with fiber core removed by corrosion.

* * * * *